United States Patent [19]

Tsujimura et al.

[11] Patent Number: 4,844,669
[45] Date of Patent: Jul. 4, 1989

[54] INSERT BORING TOOL AND CUTTING INSERT THEREFOR

[75] Inventors: Osamu Tsujimura, Kawasaki; Tatsuo Arai, Kitamoto; Takayoshi Saito, Tokyo, all of Japan

[73] Assignee: Mitsubishi Kinzoku Kabushiki Kaisha, Tokyo, Japan

[21] Appl. No.: 147,871

[22] Filed: Jan. 25, 1988

[30] Foreign Application Priority Data

Feb. 3, 1987 [JP] Japan .................................. 62-14682[U]

[51] Int. Cl.$^4$ .............................................. B23B 51/00
[52] U.S. Cl. ........................................ 408/188; 407/42;
   408/189; 408/211; 408/223; 408/713
[58] Field of Search ............... 408/199, 200, 211, 223,
   408/224, 227, 229, 713, 186, 188, 189, 194;
   407/34, 42, 53, 54, 113

[56] References Cited

U.S. PATENT DOCUMENTS

| 3,125,799 | 3/1964 | Bennett | 407/54 |
| 4,278,373 | 7/1981 | Wolfe, III | 408/199 |
| 4,367,991 | 1/1983 | Grafe et al. | 408/224 |
| 4,373,839 | 2/1983 | Negishi et al. | 408/223 |
| 4,563,113 | 1/1986 | Ebenhoch | 408/223 |
| 4,659,264 | 4/1987 | Friedline | 408/713 |

Primary Examiner—Gil Weidenfeld
Assistant Examiner—Daniel W. Howell
Attorney, Agent, or Firm—Cushman, Darby & Cushman

[57] ABSTRACT

An insert boring tool includes a tool body and a cutting insert releasably mounted thereon. The insert includes a plate defined by front and rear surfaces and a plurality of side faces and having a plurality of corners where adjacent side faces intersect one another. At least one of the corners is removed to provide a corner face. A first cutting edge is defined by the front surface and one of the side faces adjacent to the corner face, and a straight second cutting edge is defined by the front surface and the corner side face. The first and second cutting edges intersect each other at an obtuse angle, and are indexed in an end cutting position. The front surface has a marginal portion extending along the second cutting edge and inclined in such a manner that a thickness of the plate between the marginal portion and the rear surface is progressively reduced toward the second cutting edge. The axis of the body passes through the second cutting edge so that the first cutting edge and at least a part of the second cutting edge are indexed in an end cutting position.

9 Claims, 3 Drawing Sheets

INSERT BORING TOOL AND CUTTING INSERT THEREFOR

BACKGROUND OF THE INVENTION

1. Field of the Invention

The present invention pertains to an insert boring tool such as an end mill and a drill bit, and to a cutting insert suitably utilized for such a boring tool.

2. Prior Art

FIGS. 1 and 2 of the acompanying drawings show an example of a conventional insert end mill which comprises a generally cylindrical tool body 100 having an axis O of rotation therethrough and having a pair of chip pockets 102 formed in a forward end portion 104 thereof. An insert receiving recess or seat 106, 108 is formed in a wall surface of each chip pocket 102 facing in the direction of rotation of the body 100, the recess 106 being disposed adjacent to the axis O of the body 100 while the recess 108 is spaced radially outwardly from the axis O of the body 100. A pair of cutting inserts 110, each of which comprises a generally rhombic plate having a pair of diagonally opposed acute corners, are releasably received in the recesses 106 and 108, respectively, and fixedly secured thereto through clamp screws 112, respectively.

Each insert 110 has a front surface 114 having marginal ridges serving as cutting edges and a rear surface 116 to be rested on a respective one of the recesses 106 and 108. The insert received in the recess 106 is disposed so that one of the cutting edges is indexed in an end cutting position to serve as an end cutting edge 118 while the insert received in the recess 108 is disposed so that in addition to one of the cutting edges indexed in an end cutting position to serve as an end cutting edge 120, the cutting edge which intersects the indexed end cutting edge 120 at an acute angle is indexed in a peripheral cutting position to serve as a peripheral cutting edge 122.

Thus, when the end mill is rotated about the axis O of the body 100 to form a groove G in a workpiece W, the end cutting edges 118 and 120 of both the inserts 110, as schematically shown in FIG. 3, cooperate to cut the workpiece to form a bottom $G_1$ of the groove while the peripheral cutting edge 122 of the insert 110 received in the recess 108 forms inner peripheral surface $G_2$ of the groove.

In the end mill as described above, however, the inserts 110 are liable to undergo a great thrust load particularly upon beginning to engage the workpiece, and besides the cutting speed is relatively low at the radially inner ends of the respective end cutting edges, designated at 118a and 120a in FIG. 3. Therefore, such inner ends of the end cutting edges 118 and 120 have been susceptible to chipping or fracture.

SUMMARY OF THE INVENTION

It is therefore an object of the present invention to provide an insert boring tool in which the cutting edges are hardly subjected to chipping during the cutting operation, thereby achieving excellent cutting performance.

Another object of the present invention is to provide a cutting insert which is suitably used for the above boring tool and has an end cutting edge exhibiting an excellent strength even in its inner end.

According to the first aspect of the present invention, there is provided an insert boring tool comprising a tool body of a generally circular cross section having an axis of rotation therethrough and having forward and rearward ends; and a cutting insert comprising a plate defined by front and rear surfaces and a plurality of side faces joining the front and rear surfaces, the plate having a plurality of corners where adjacent side faces intersect one another, at least one of the corners being removed to provide a corner face, the insert having a first cutting edge defined by the front surface and one of the side faces adjacent to the corner face and having a straight second cutting edge defined by the front surface and the corner face and intersecting the first cutting edge at an obtuse angle, the front surface having a marginal portion extending along the second cutting edge and inclined in such a manner that a thickness of the plate between the marginal portion and the rear surface is progressively reduced toward the second cutting edge, the insert being releasably mounted on the forward end of the tool body in such a manner that the axis of the body passes through the second cutting edge so that the first cutting edge and at least a part of the second cutting edge are indexed in an end cutting position.

According to the second aspect of the present invention, there is provided an indexable cutting insert for a boring tool comprising a plate defined by front and rear surfaces and a plurality of side faces joining the front and rear surfaces, the plate having a plurality of corners where adjacent side faces intersect one another, at least one of the corners being removed to provide a corner face, the plate having a first cutting edge defined by the front surface and one of the side faces adjacent to the corner face and having a straight second cutting edge defined by the front surface and the corner face and intersecting the first cutting edge at an obtuse angle, the front surface having a marginal portion extending along the second cutting edge and inclined in such a manner that a thickness of the plate between the marginal portion and the rear surface is progressively reduced toward the second cutting edge.

DESCRIPTION OF THE PREFERRED EMBODIMENTS OF THE INVENTION

Figure 1:
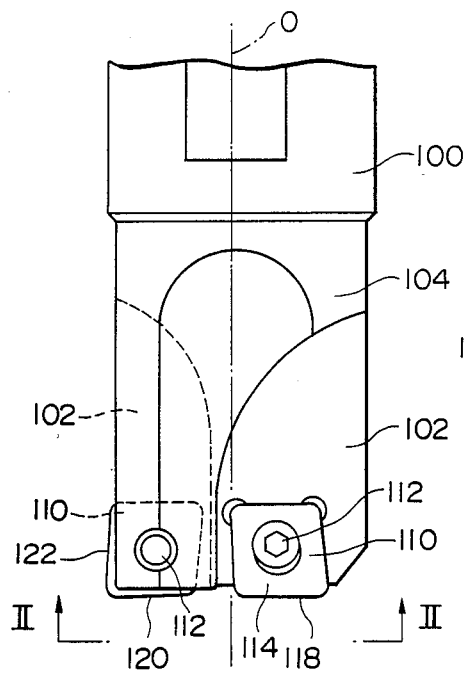
FIG. 1 is a front-elevational view showing a conventional insert end mill.
Figure 2:
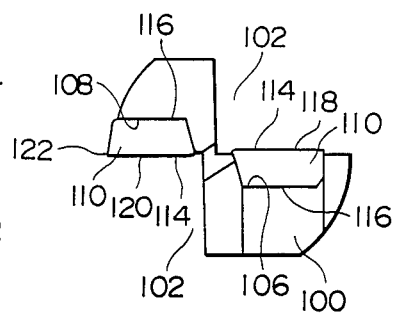
FIG. 2 is an end view of the end mill of FIG. 1 as seen in the direction indicated by the arrows II—II in FIG. 1.
Figure 3:
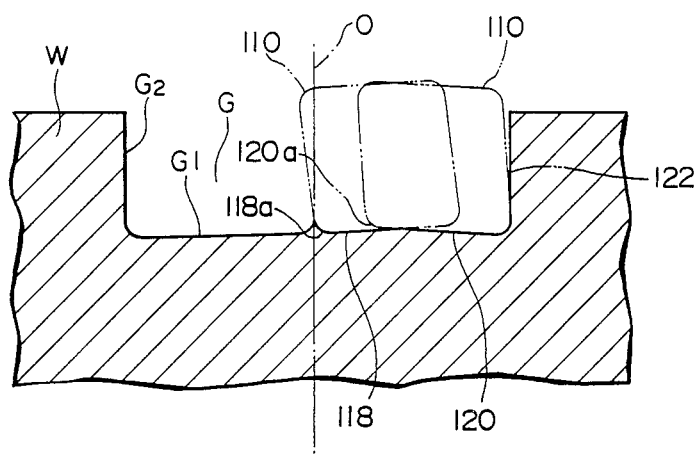
FIG. 3 is a schematic cross-sectional view of a workpiece being processed by the end mill of FIG. 1, but showing how the cutting edges of the end mill cut the workpiece.
Figure 4:
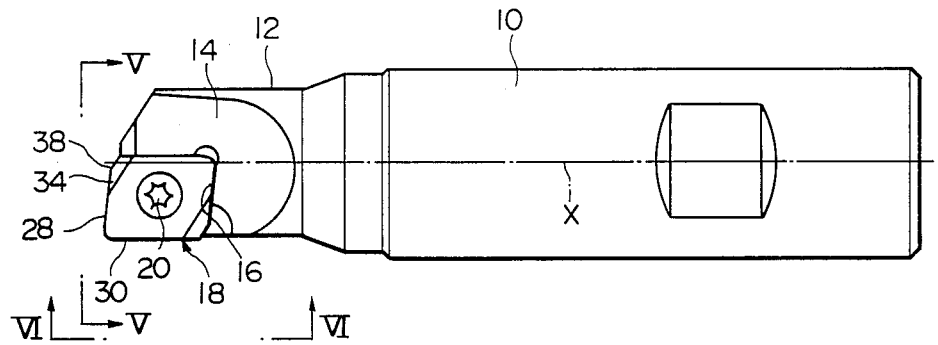
FIG. 4 is a front-elevational view of an insert boring tool in accordance with the present invention.
Figure 5:
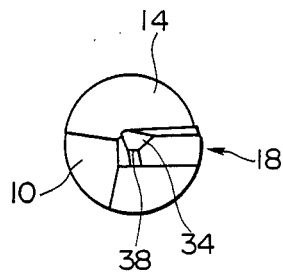
FIG. 5 is an end mill of the tool of FIG. 4 as seen in the direction indicated by the arrows V—V in FIG. 4.
Figure 6:
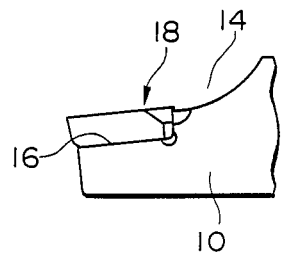
FIG. 6 is a fragmentary side-elevational view of the tool of FIG. 4 as seen in the direction indicated by the arrows VI—VI in FIG. 4.
Figure 7:
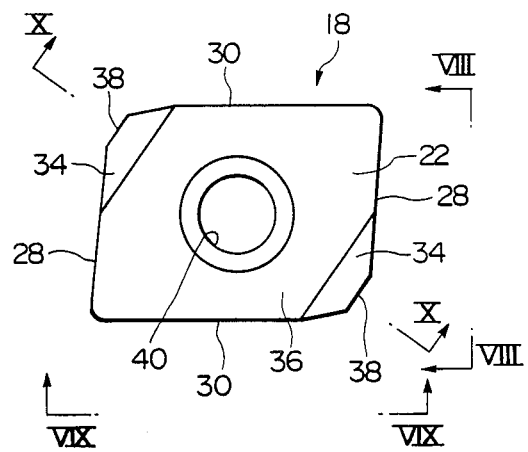
FIG. 7 is a plan view of a cutting insert employed in the tool of FIG. 4.
Figure 8:
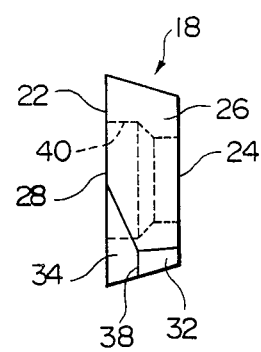
FIG. 8 is a view of the insert of FIG. 7 as seen in the direction indicated by the arrows VIII—VIII in FIG. 7.
Figure 9:
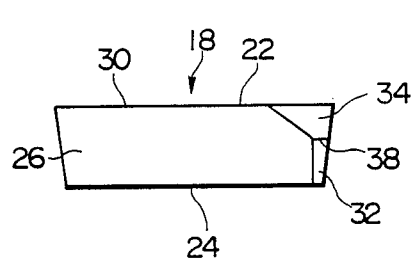
FIG. 9 is a view of the insert of FIG. 7 as seen in the direction indicated by the arrows VIX—VIX in FIG. 7.
Figure 10:
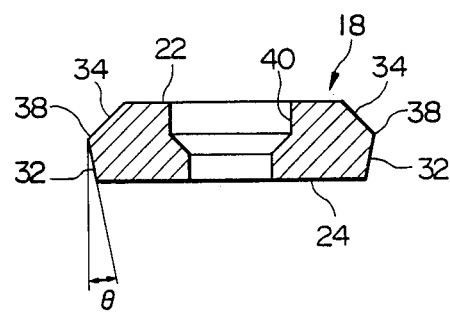
FIG. 10 is a cross-sectional view of the insert of FIG. 7 as seen in the direction indicated by the arrows X—X in FIG. 7.

Referring now to FIGS. 4 to 10, an insert end mill in accordance with the present invention comprises a generally cylindrical body 10 having an axis X of rotation therethrough and having a forward end portion 12 provided with a chip pocket 14. Formed in the wall surface of the chip pocket 14 is an insert receiving recess 16 or insert seat which is generally facing in the direction of rotation of the body 10, and an indexable cutting insert 18 is received in the recess 16 and releasably fixed thereto through a clamp screw 20.

The insert 18, as shown more detailedly in FIGS. 7 to 10, is comprised of a generally parallelogrammic plate defined by a front surface 22 and a rear surface 24 disposed generally parallel to the front surface 22 and four side faces 26 joining the front and rear surfaces 22 and 24, and includes two pairs of short and long cutting edges 28 and 30 each defined by a respective one of four marginal ridges of the front surface 22. Each side face 26 is sloping inwardly in a direction away from the front surface 22 to serve as a flank for a respective one of the cutting edges. Two diagonally-disposed obtuse corners of the plate are respectively removed to provide corner side faces 32, and the front surface 22 is comprised of an opposed pair of corner marginal portions 34 each disposed adjacent to a respective one of the corner side faces, and a central portion 36 disposed between the corner marginal portions 34. Each of the corner marginal portions 34 is inclined with respect to the central portion 36 in such a manner that a thickness of the insert between the front and rear surfaces 22 and 24 is progressively reduced toward a respective obtuse corner, and thus each of the cutting edges 28 and 30 comprises a first edge portion defined by a respective one of the marginal ridges of the central portion 36 and a second edge portion defined by a respective one of the marginal ridges of the corner marginal portions. Further, the insert includes a pair of straight corner cutting edges 38 each defined by a respective one of the corner side faces 32 and a respective one of the corner marginal portions 34 and intersecting the cutting edge 28 at an obtuse angle. Each corner side face is also sloping inwardly in a direction away from the front surface 22 to serve as a flank with a relief angle $\theta$ for a respective one of the corner cutting edges. In addition, the insert has a central mounting hole 40 into which the mounting screw 20 is inserted.

The insert 18 is disposed so that one of the long cutting edges 30 is indexed in a peripheral cutting position to serve as a peripheral cutting edge while the short cutting edge 28 which intersects this indexed long cutting edge at an acute angle and the corner cutting edge 38 which intersects this short cutting edge 28 at an obtuse angle are both indexed in an end cutting position to serve as an end cutting edge. As illustrated in the drawings, the indexed short cutting edge 28 extends generally radially of the body 10 while the indexed corner cutting edge 38 extends generally radially inwardly toward a rearward end of the body and terminates in a position slightly across the axis X of the body 10.

For processing the workpiece W to form the groove G therein by using the end mill as described above, the end mill is rotated about the axis X of the body 10, and thus the end cutting edge, which comprises the short cutting edge 28 and the corner cutting edge 38, cuts the workpiece W to form the bottom $G_1$ of the groove while the peripheral cutting edge 30 cuts the workpiece W to form the inner peripheral surfaces $G_2$ of the groove. By performing the axial cutting operation, the bottom $G_1$ of the groove is cut so as to have a protrusion of an inverted V-shape, but this protrusion is subsequently cut to be flat by the outer end of the end cutting edge when performing a cross feed cutting operation.

Figure 11:
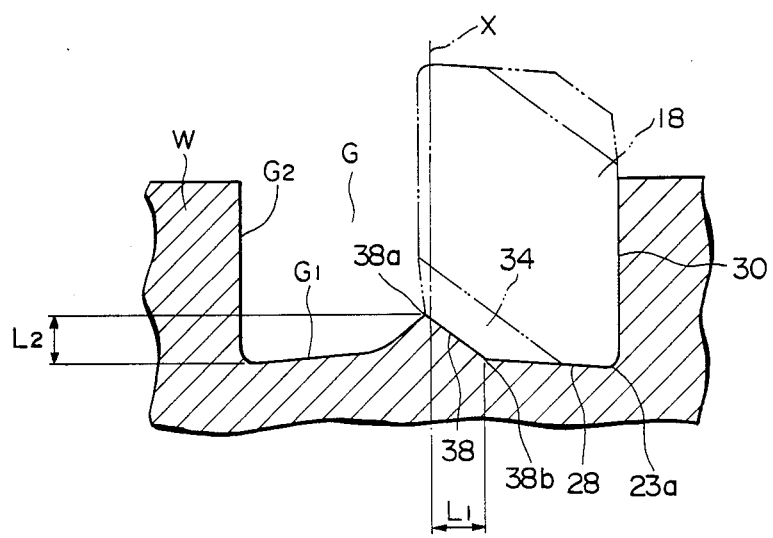
FIG. 11 is a view similar to FIG. 3, but showing how the cutting edges of the tool of FIG. 4 cut the workpiece.

In the end mill described above, the inner and outer ends 38a and 38b of the indexed corner cutting edge 38 are located at corners provided with an obtuse angle, respectively. Besides, with respect to the outer end 38b, a relatively high cutting speed can be attained at its position since the outer end 38b is spaced radially outwardly of the body 10 from the axis X by a sufficient distance, as designated by $L_1$ in FIG. 11. Also, the inner end 38a is spaced axially rearwardly of the body 10 from the outer end 38b by a sufficient distance, as designated by $L_2$ in FIG. 11. Accordingly, although the inner and outer ends 38a and 38b would be subjected to a great thrust load during the boring operation, such ends 38a and 38b are less susceptible to chipping or fracture even upon beginning to engage the workpiece W.

Figure 12:
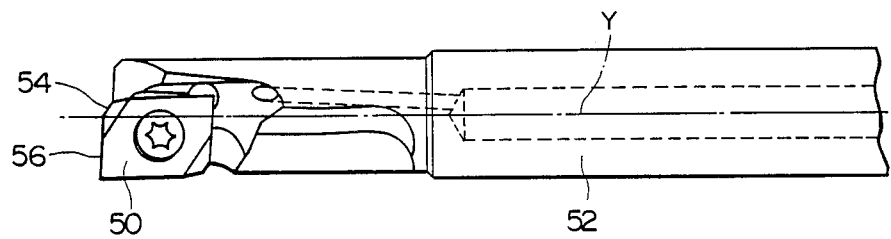
FIG. 12 is a front-elevational view showing a modified boring tool in accordance with the present invention.

While the boring tool according to the present invention has been specifically shown and described therein, the invention itself is not to be restricted to the above embodiment. For example, the insert may be of a square shape, and it may be employed for a drill bit as shown in FIG. 12. In this embodiment, an insert 50 is mounted on a drill body 52 so that the axis Y of the body passes through that end of a corner cutting edge 54 where the corner cutting edge intersects a short cutting edge 56 at an obtuse corner, but it may be disposed so that the axis of the body passes through another point of the corner cutting edge 54. With this construction, although the inner end of the short cutting edge 56 is disposed adjacent to or at the axis of the body, it has a sufficient strength as the short and corner cutting edges intersect each other at an obtuse angle.

What is claimed is:
1. An insert boring tool comprising:
a tool body of a generally circular cross section having an axis of rotation therethrough and having forward and rearward ends; and
a cutting insert comprising a plate defined by front and rear surfaces and a plurality of side faces joining said front and rear surfaces, said plate having a plurality of corners where adjacent side faces intersect one another, at least one of said corners being removed to provide a corner face, said insert having a first cutting edge defined by said front surface and one of said side faces adjacent to said corner face and having a straight second cutting edge defined by said front surface and said corner face and intersecting said first cutting edge at an obtuse angle, said front surface having a marginal portion extending along said second cutting edge and inclined in such a manner that a thickness of said plate between said marginal portion and said rear surface is progressively reduced toward said second cutting edge, said insert being releasably mounted on said forward end of said tool body in such a manner that said axis of said body passes through said second cutting edge so that said first cutting edge and at least a part of said second cutting edge are indexed in an end cutting position.

2. An insert boring tool according to claim 1, in which said first cutting edge extends generally radially of said body while said second cutting edge extends generally radially inwardly toward said rearward end of said body and terminates generally at said axis of said body.

3. An insert boring tool according to claim 1, in which that end portion of said second cutting edge disposed remote from said first cutting edge extends across said axis of said body.

4. An insert boring tool according to claim 1, in which said insert has a third cutting edge defined by said front surface and that side face disposed adjacent to said one side face and remote from said corner face, said third cutting edge being indexed in a peripheral cutting position so as to extend generally parallel to said axis of said body.

5. An insert boring tool according to claim 1, in which said corner face and said one side face of said insert are sloping inwardly away from said front surface.

6. An indexable cutting insert for a boring tool comprising a plate defined by front and rear surfaces and a plurality of side faces joining said front and rear surfaces, said plate having a plurality of corners where adjacent side faces intersect one another, at least one of said corners being removed to provide a corner face, said plate having a first cutting edge defined by said front surface and one of said side faces adjacent to said corner face and having a straight second cutting edge defined by said front surface and said corner face and intersecting said first cutting edge at an obtuse angle, said front surface having a marginal portion extending along said second cutting edge and inclined in such a manner that a thickness of said plate between said marginal portion and said rear surface is progressively reduced toward said second cutting edge.

7. A cutting insert according to claim 6, in which said plate is of a generally square shape.

8. A cutting insert according to claim 6, in which said plate is of a generally parallelogrammic shape.

9. A cutting insert according to claim 6, in which said plate has a third cutting edge defined by said front surface and that side face disposed adjacent to said one side face and remote from said corner face.

* * * * *